US008604700B2

(12) United States Patent
Waumans et al.

(10) Patent No.: US 8,604,700 B2
(45) Date of Patent: Dec. 10, 2013

(54) ILLUMINATION ARRANGEMENT FOR ILLUMINATING HORTICULTURAL GROWTHS

(75) Inventors: Lars Rene Christian Waumans, Eindhoven (NL); Joseph Hendrik Anna Maria Jacobs, Eygelshoven (NL); Esther Van Van Echtelt, Eindhoven (NL); Antonius Adrianus Maria Marinus, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 410 days.

(21) Appl. No.: 13/002,801

(22) PCT Filed: Jul. 3, 2009

(86) PCT No.: PCT/IB2009/052893
§ 371 (c)(1),
(2), (4) Date: Jan. 6, 2011

(87) PCT Pub. No.: WO2010/004489
PCT Pub. Date: Jan. 14, 2010

(65) Prior Publication Data
US 2011/0115385 A1    May 19, 2011

(30) Foreign Application Priority Data
Jul. 11, 2008    (EP) .................................... 08160159

(51) Int. Cl.
*H05B 37/00*    (2006.01)
*A01G 9/00*    (2006.01)
(52) U.S. Cl.
USPC ............................................. 315/149; 47/44

(58) Field of Classification Search
USPC .................. 47/44, 46, 47; 362/227, 230, 231; 315/149, 158, 159, 157, 156, 152
See application file for complete search history.

(56) References Cited

U.S. PATENT DOCUMENTS

| 4,771,371 | A | 9/1988 | Mori |
| 6,663,659 | B2 | 12/2003 | McDaniel |
| 6,921,182 | B2 | 7/2005 | Anderson, Jr. et al. |
| 7,033,060 | B2 | 4/2006 | Dubuc |
| 7,160,717 | B2 | 1/2007 | Everett |
| 2003/0005626 | A1* | 1/2003 | Yoneda et al. ..................... 47/69 |
| 2010/0039804 | A1* | 2/2010 | Budde et al. .................. 362/231 |

FOREIGN PATENT DOCUMENTS

| EP | 1762135 A1 | 3/2007 |
| EP | 2044835 A1 | 4/2009 |
| GB | 2444082 A | 5/2008 |
| NL | 1031466 C2 | 10/2007 |
| WO | 2007007220 A1 | 1/2007 |
| WO | 2007007235 A2 | 1/2007 |
| WO | 2008026170 A2 | 3/2008 |
| WO | 2008078277 A1 | 7/2008 |

* cited by examiner

*Primary Examiner* — David H Vu
(74) *Attorney, Agent, or Firm* — David Zivan; Mark Beloborodov

(57) ABSTRACT

The invention provides an illumination arrangement (1) for illuminating horticultural growths (100) with for instance LEDs as a light source. These LEDs are placed in a lighting unit (10). The lighting unit may especially have the ability to direct substantially all light from the light source (here the LEDs) to the horticultural growths (in the greenhouse). Additionally, a horticultural growth-recognition system (50) can be implemented in the illumination arrangement, so that the system can adapt for instance its beam (11) to the location of the horticultural growth(s) (in the case of growth or moving of plants, etc).

15 Claims, 8 Drawing Sheets

ILLUMINATION ARRANGEMENT FOR ILLUMINATING HORTICULTURAL GROWTHS

FIELD OF THE INVENTION

The invention relates to an illumination arrangement for illuminating horticultural growths. The invention further relates to a climate controlled room, such as a greenhouse, for growing horticultural growths, comprising the illumination arrangement according to the invention.

BACKGROUND OF THE INVENTION

Artificial lighting of horticultural growths is known in the art and can be used instead of solar light or in addition to solar light.

In the field of plants, research is going on in particularly those processes which are driven by the chemical capture of light energy. At the same time, research into new methods of converting electricity into light of particular wavelengths has led some engineers to try to produce artificial lighting which promotes plant growth. For instance energy inefficient "white light" sources may be modified to produce more light at wavelengths known to promote plant growth and health. This hybrid technology, in which the bulk of the light from these enhanced "plant grow lights" cannot be used efficiently by plants, has dominated the market for four decades.

In U.S. Pat. No. 6,921,182 it was found that the proportion of twelve red 660 nm LEDs plus six orange 612 nm LEDs and one blue 470 nm LED was optimal. The preferred circular lamp described accommodated two of these optimal sets of LEDs, resulting in a device with twenty-four red 660 nm LEDs, twelve orange 612 nm LEDs, and two blue 470 nm LEDs. Also, in U.S. Pat. No. 6,921,182 it was described to use mixed LED strings that contained both types of LEDs for enhanced wavelength mixing.

LEDs were used having two beam spreads of 15° and 30°, in equal proportions, for both the 660 nm LEDs and 612 nm LEDs. When LED light was directed perpendicularly to the upper surface of mature cotton plant leaves, it was found that a quantum light sensor placed below the leaf registered 10% light transmission for the 30° LEDs, and 80% light transmission for the 15° LED, and as much as 50% of the orange/red spectrum primarily used for photosynthesis was transmitted through the upper leaf canopy, making it available to support photosynthesis in leaves below.

SUMMARY OF THE INVENTION

A disadvantage of the prior art lighting may be the relative difficulty to adjust the light source to the changing and developing horticultural growths over time. The total leaf area covering the greenhouse floor changes as plants grow. In present-day greenhouse lighting systems, a lot of light is not directed onto the plant leaves, especially if the plants are still small. The lighting system becomes more efficient if for instance the beam shape (such as the beam angle) could be changed depending on the leaf area. Hence, in time the horticultural growth grows and the light source may be adapted to efficiently illuminate the horticultural growth.

A lot of light pollution may occur with the present systems, such as when using discharge lamps, due to a non-optimal beam from the light source and reflections within the greenhouse. This may have the disadvantages of high energy costs due to low photon utilisation, light is not green-switch-proof (energy is wasted), an unappealing aesthetic effect of the greenhouse area during the night due to the light pollution, and the light pollution has a negative effect on the biorhythm of plants, animals and humans. Hence, efficient lighting is preferable.

Further, in some greenhouses plants are moved around to make harvesting easier and more efficient. Superfluous lighting cannot easily be avoided with prior art systems.

Further, the prior lighting systems do not easily allow a change in spectra (over time) to meet the demands of a specific horticultural growth (over time) or to meet the demands of different types of horticultural growths.

The present invention describes an illumination arrangement with for instance LEDs as light source. These LEDs are placed in a lighting unit. The lighting unit may especially have the ability to direct substantially all light from the light source (here the LEDs) to the horticultural growth(s) (in the greenhouse). Additionally, a horticultural growth-recognition system can be implemented in the illumination arrangement, so the system can adapt for instance its beam to the location of the horticultural growth (in the case of growth, moving of plants, etc).

Hence, it is an aspect of the invention to provide an alternative illumination arrangement, which preferably further at least partly obviates one or more of the above-described drawbacks. It is further an aspect of the invention to provide an alternative climate controlled room, such as a greenhouse, which preferably further at least partly obviates one or more of the above-described drawbacks.

Therefore, in an embodiment, the invention provides an illumination arrangement for illuminating horticultural growths, wherein the illumination arrangement comprises (a) a lighting unit arranged to generate a beam of light and to control an optical property of the beam of light in response to a control signal, (b) an electromagnetic wave sensor arranged to sense the horticultural growth(s) and to generate a sensor signal, and (c) a control unit arranged to process the sensor signal to produce the control signal.

The sensor is especially arranged to sense (or monitor) the horticultural growth(s) and the control unit derives from the sensor signal of the sensor the information to control the lighting unit which controls the optical properties of the beam of light in response to the control signal generated by the control unit, the lighting unit thus providing the illumination of the horticultural growth(s). As a result of the sensor, the control unit and the controllable optical properties of the beam of light, the beam of light may be adapted to the desired optical properties such as beam spectrum, beam shape and beam flux. Especially, based on predetermined relations between the sensor signal and, optionally, other signals, (like signals from a temperature sensor), the optical properties of the beam are controlled. The term "optical property" may refer to one or more optical properties.

Hence, in a specific embodiment, the control unit is arranged to process the sensor signal to produce the control signal by determining (deriving) one or more characteristics from the sensor signal selected from the group consisting of horticultural growth type, horticultural growth size, speed of growth of the horticultural growth, horticultural growth location, and horticultural growth appearance (such as one or more of horticultural growth colour, horticultural growth fruit content, horticultural growth fruit density) and calculating ("processing") the corresponding control signal to influence the growth of the horticultural growth by means of one or more optical properties of the beam of light, especially selected from the group consisting of beam flux (herein also indicated as "flux"), beam shape (herein also indicated as "shape"), and beam spectrum (herein also indicated as "spectrum").

Hence, in a specific embodiment, the control unit is arranged to process the sensor signal to produce the control signal in response to a predetermined relation between one or more optical properties of the beam of light, especially selected from the group consisting of beam flux, beam shape, and beam spectrum, and (a) one or more horticultural growth characteristics derivable from the sensor signal, and (b) optionally one or more of a timer signal, an environment sensor signal and an information sensor signal.

The one or more characteristics derivable from the sensor signal may be selected from the group consisting of horticultural growth type, speed of growth of the horticultural growth, horticultural growth location, and horticultural growth appearance (such as one or more of horticultural growth colour, horticultural growth fruit content, and horticultural growth fruit density). The timer signal, environment sensor signal and information sensor signal may be generated by (a) sensor(s) other than the electromagnetic wave sensor(s), i.e. by an environment sensor and a specification information sensor(s), respectively. The timer signal may also be generated by the control unit itself.

A control signal addressing the lighting unit for controlling the beam shape may herein also be indicated as beam shape control signal. A control signal addressing the lighting unit for controlling the beam spectrum may herein also be indicated as beam spectrum control signal. A control signal addressing the lighting unit for controlling the beam flux may herein also be indicated as beam flux control signal. The control signal may be used to control one or more of these properties.

As mentioned above, in a specific embodiment, the optical property comprises the shape of the beam of light, and especially the control unit and the beam controller are arranged to control the beam of light to illuminate substantially only the horticultural growth(s). In this way, lighting of the horticultural growth(s) may be optimal, while superfluous lighting is substantially minimized and changes in appearance (like growth) and/or movement (including transport along the illumination arrangement) of the horticultural growth(s) can be taken into account. Further, the changing total leaf area as a function of the growth of the horticultural growth may efficiently be controlled by means of the illumination during the growth, since the illumination arrangement may tune the beam shape and/or beam flux and/or beam spectrum with respect to time, depending upon the type of horticultural growth and/or consumer demands.

In an embodiment, the beam controller comprises one or more optical elements to control the shape of the beam of light selected from the group consisting of an electrowetting lens, a liquid crystalline lens, a controllable scattering element, a controllable diffraction element, a refraction element and a reflection element. Such beam controllers are known in the art, and are for instance described in WO2007/007220 and WO2007/007235, which are incorporated herein by reference.

In yet another embodiment, the beam controller comprises an adjustable mechanical optical beam shaping system, such as for instance rotating (or rotatable) collimators. The term "beam controller" may also refer to a plurality of beam controllers. Hence, the lighting unit may comprise one or more of the above mentioned beam controllers, which may in an embodiment especially be arranged in series.

It may be desirable to control the flux of light, for instance in view of growth speed, in view of imposing a day-night cycle, etc. Hence, in a further embodiment (that may be used to provide a day-night cycle), the optical property comprises the flux of the beam of light, the control signal comprises a beam flux control signal, and the lighting unit is further arranged to control the flux of the beam of light in response to the beam flux control signal, and the control unit is arranged to process the sensor signal to produce the beam flux control signal. Hence, in an embodiment, the control unit and the lighting unit are further arranged to provide a predetermined light-dark cycle. Also in view of horticultural growth demands or consumer demands, the beam flux may be changed with time. For instance, when information derived from the sensor signal indicates that the growth of the horticultural growth is too slow, the flux may be increased.

In a specific embodiment, the lighting unit comprises a plurality of light sources, such as a plurality of LEDs, like 2-1000 LEDs, such as 4-100 LEDs, especially 4-24 LEDs. The term "LED" refers to OLED and solid state LEDs, but especially refers to the latter type of LEDs. When the lighting unit comprises a plurality of light sources, two or more light sources may have the same or different beam spectra (i.e. the wavelength range(s)) of the light emitted by the individual light sources), like for instance RGB LEDs.

Hence, in a specific embodiment, the lighting unit comprises a plurality of light sources with a plurality of different spectra, respectively. Using a plurality of light sources (such as LEDs), of which two or more generate light at different wavelengths, such a configuration allows adapting the spectrum of the beam of light (i.e. the wavelength range(s)) of the light of the beam of light) depending upon for instance the sensor signal. Another advantage of using a plurality of light sources may be that the light sources may be addressed individually by the control unit, thereby further enabling beam shape, beam flux and optionally beam spectrum control to be adapted.

In yet a further embodiment, the beam of light consists of light having a variable beam spectrum, and the lighting unit is arranged to control the beam spectrum of the beam of light in response to the control signal. Such an illumination arrangement may be obtained by using a plurality of light sources with different spectra (as described above), but may alternatively, or in addition thereto, also be obtained by using colour filters. The application of different spectra with respect to time may be used to optimally meet the demands of the horticultural growth. However, the variability of the spectrum may also be used to optimize the spectrum with respect to the horticultural growth under illumination.

Hence, in a further embodiment, the control signal comprises a spectrum control signal, the lighting unit is further arranged to provide a predefined beam spectrum corresponding to the determined horticultural growth type in response to the spectrum control signal, and the control unit is further arranged to determine one of a plurality of predefined types of horticultural growth from the sensor signal and to produce the spectrum control signal. The control unit may comprise a library of predefined types of horticultural growths, at least one type of horticultural growth, but preferably two or more, such as at least five types of horticultural growths. From the sensor signal, the control unit derives the type of horticultural growth, and the control unit then chooses, based on predetermined relations programmed in the (software of the) control unit, the specific beam spectrum and provides the corresponding control signal to the lighting unit. Hence, the illumination arrangement allows tailoring the beam spectrum to the type of horticultural growth. Here, the spectrum control signal may also be indicated as "horticultural growth type defined beam spectrum control signal".

The optical properties of the beam of light that may be controlled are especially selected from the group consisting of beam flux, beam shape, and beam spectrum. More especially, the optical properties of the beam of light are the beam shape and optionally one or more selected from the group consisting of beam flux and beam spectrum.

The beam of light of the illumination arrangement according to the invention may comprise, in an embodiment, a plurality of individual beams of light, wherein the lighting unit is further arranged to control the optical properties of the individual beams of light in response to the control signal. Controlling the optical properties of the individual beams of light in response to the control signal may be achieved by one or more of (a) addressing individual light sources, in embodiments wherein the individual beams of light stem from individual light sources, (b) addressing individual colour filters for the individual light sources, and (c) addressing individual beam controllers, in embodiments wherein the optical properties of the individual beams of light are controlled by individually addressable beam controllers. Note that the presence of a plurality of beam controllers does not necessarily include a plurality of light sources. Further, note that the plurality of individual beams of light may be generated by one or more of a plurality of light sources, a plurality of beam controllers (controlling a single light source or controlling a plurality of beam light sources) and a louver structure (or corresponding structures).

Hence, in a specific embodiment, the beam controller comprises a plurality of beam controllers, and the beam controllers are arranged to control the optical properties (especially the beam shape and/or beam flux) of the individual beams of light in response to the control signal. While a single beam may still lead to less optimal use of light, a plurality of individually controllable beams of light may further optimize the use of light, and may further allow shaping of the beam of light to the specific horticultural growth under illumination. By controlling the beam flux and/or beam shape of the individual beams of light, the beam shape (and optionally also the beam flux) of the beam of light (composed of the individual beams of light) can be controlled by the control unit.

In an embodiment, the optical property comprises the shape of the beam of light, the control signal comprises a beam shape control signal, the lighting unit is arranged to control the shape of the beam of light in response to the beam shape control signal, and the control unit is arranged to determine the location of the horticultural growth(s) from the sensor signal to produce the beam shape control signal. The term "location" refers to a point or extent in space. Hence, the term "location" may refer to the specific (temporary) position of the horticultural growth(s), but the term "location" may also refer to the entire number of positions occupied by the horticultural growth(s), i.e. its extent (at a certain moment in time).

The illumination arrangement may, in an embodiment, further comprise an environment sensor selected especially from the group consisting of a humidity sensor, an irrigation sensor, a temperature sensor, a gas sensor, a nutrient sensor, and a background light sensor, wherein the environment sensor is arranged to generate an environment sensor signal, and wherein the control unit is further arranged to process the environment sensor signal to produce the control signal. For instance, information about the humidity of the environment surrounding the horticultural growth(s), the amount of irrigation provided and/or received, the temperature of the environment surrounding the horticultural growth(s), the gas concentration or gas type (such as the concentration of CO), the amount of nutrient provided to the horticultural growth(s), and the amount of background light, may be used by the control unit to tune the optical properties of the beam such as flux, spectrum and shape. Thereby, the control unit may control the lighting unit to optimally illuminate the horticultural growth.

Optionally, the control unit is also arranged to control one or more environment parameters, such as environment parameters especially selected from the group consisting of humidity, irrigation, temperature, gas atmosphere, nutrients, and background light, especially as a function of the predetermined relations between the information derivable from the sensor signal and one or more of the environment parameters.

In yet another embodiment, the illumination arrangement further comprises a specification information sensor selected from the group consisting of RFID sensors, wherein the specification information sensor is arranged to generate a specification information sensor signal, and wherein the control unit is further arranged to process the specification information sensor signal to produce the control signal. For instance, the horticultural growth may be labelled with a RFID chip with specification information selected from the group consisting of the desired delivery date, the horticultural growth type, the desired horticultural growth size, the desired ripeness of the horticultural growth, etc. etc. The RFID sensor, or another specification information sensor, receives the (RFID chip) specification information and couples the specification information sensor signal to the control unit, which may be arranged to use this specification information to tune the optical properties of the beam such as flux, spectrum and shape. Thereby, the control unit may control the lighting unit to optimally illuminate the horticultural growth.

Hence, the information (including horticultural growth characteristics) that can be derived is selected from the group consisting of (a) one or more of horticultural growth type, horticultural growth speed, horticultural growth location, horticultural growth appearance signal (such as one or more of horticultural growth colour, horticultural growth fruit content, and horticultural growth fruit density), which information may be derived from the sensor signal, and optionally (b) one or more of environment information and specification information (such as one or more of desired delivery date, horticultural growth type, desired ripeness of the horticultural growth), which information may be derived from the environment sensor and specification information sensor, respectively.

The electromagnetic wave sensor may comprise a sensor selected from the group consisting of an IR image sensor and a visible light image sensor. Such sensors may make (3D) images of the horticultural growth crop(s), which (3D) images are used as sensor signal from which the control unit derives the desired information. The sensor may for instance be selected from the group consisting of a CCD camera, a CMOS camera, or another digital camera. Such sensors may be arranged to measure IR light and/or visible light.

The electromagnetic wave sensor may also be a radar sensor, arranged to provide a (3D) image with the help of radar waves. Hence, in another embodiment, the electromagnetic wave sensor comprises a radar sensor. The term "sensor" may also relate to a plurality of sensors, i.e. two or more sensors. Further, the term "plurality of sensors" may relate to a plurality of sensors of the same type, or of different types, such as a plurality of VIS sensors and a plurality of IR sensors.

In an embodiment, the illumination arrangement comprises a plurality of lighting units, which may be addressed (preferably individually) by the control unit. Preferably, in the embodiment wherein the illumination arrangement comprises a plurality of lighting units, the illumination arrangement further comprises a plurality of beam controllers, wherein the beam controllers are arranged to control the shape of the beams of light of the lighting units in response to the sensor signal.

In yet a further aspect, the invention provides a climate controlled room for growing horticultural growths comprising the illumination arrangement according to the invention, as described and claimed herein.

The term "horticultural growth" is known in the art and may relate herein to any plant, crop, bush, tree, including for example vegetation that bears or is a fruit, a vegetable, a mushroom, a berry, a nut, a flower, a tree, a shrub, turf, etc. Horticultural growth herein especially relates to indoor horticultural growths, such as especially any plant, crop, bush, tree, grown for human or animal consumption or other human use, such as indoor or outdoor decoration, etc.

BRIEF DESCRIPTION OF THE DRAWINGS

Embodiments of the invention will now be described, by way of example only, with reference to the accompanying schematic drawings in which corresponding reference symbols indicate corresponding parts, and in which.

DESCRIPTION OF PREFERRED EMBODIMENTS

Figure 1:
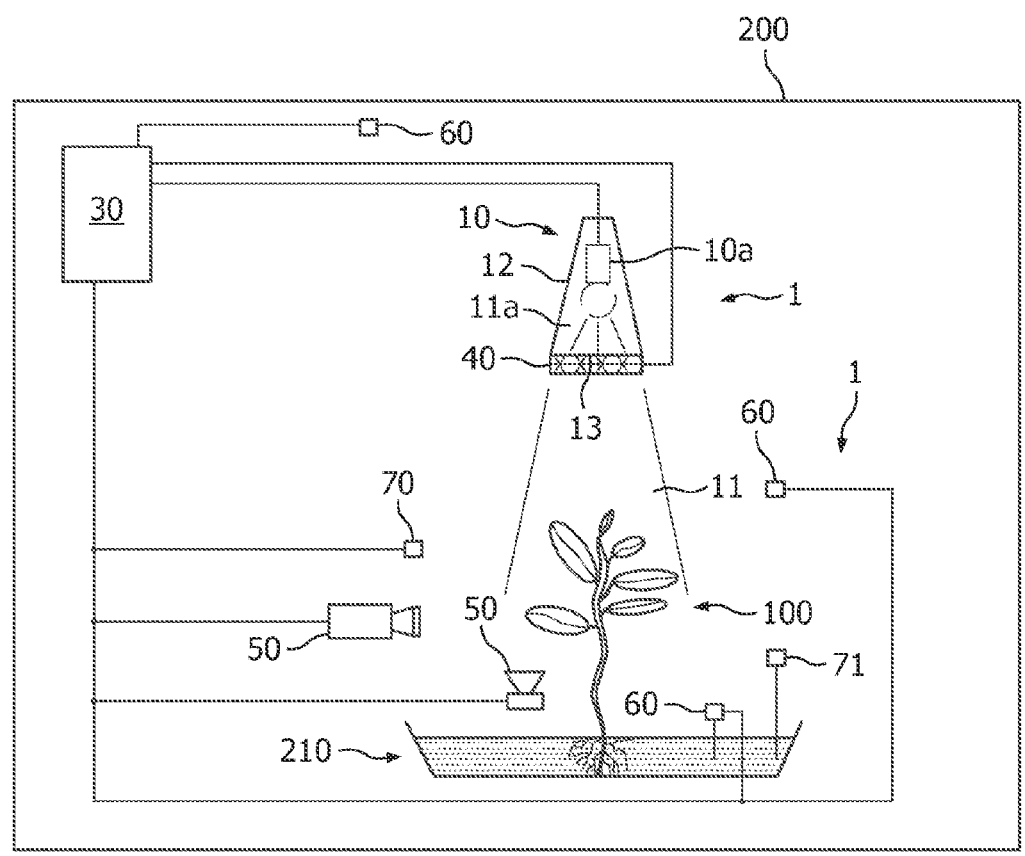
FIG. 1 schematically depicts an illumination arrangement according to an embodiment of the invention, arranged in a climate controlled room, and arranged to illuminate horticultural growths.

FIG. 1 schematically depicts an illumination arrangement 1 for illuminating a horticultural growth 100. The illumination arrangement 1 is arranged in a climate controlled room 200, such as a greenhouse. By way of example, horticultural growth 100 is depicted, arranged in a flower box 210. The invention is however not limited to illumination arrangements 1 in greenhouses or to illumination arrangements 1 arranged over horticultural growth 100 or to illumination arrangements 1 during use.

The illumination arrangement 1 comprises a lighting unit 10 arranged to generate a beam of light 11. To this end, the lighting unit 10 comprises a light source 10a, arranged to generate light 11a. This light 11a may be further shaped into a beam by a (variable) collimator or (variable) other optics. In FIG. 1 (and FIG. 2), the further optics is a reflector or collimator 12 (further indicated as collimator), but alternatively or in addition, also other optics may be applied. The illumination arrangement 1, or more particularly, the lighting unit 10, is further arranged to control an optical property of the beam of light 11 in response to a control signal. The control of this optical property, such as the flux, spectrum or beam width, etc., may be controllable by lenses, filters, individual addressing of individual light sources 10a, etc.

The illumination arrangement 1 further comprises an electromagnetic wave sensor 50 arranged to sense the horticultural growth 100 and to generate a sensor signal. The electromagnetic wave sensor(s) 50 may comprise a sensor selected from the group consisting of an IR image sensor and a visible light image sensor, such as a CCD camera, a CMOS camera, or another digital camera. Such sensors may be arranged to measure IR light and/or visible light. The electromagnetic wave sensor 50 may also be a radar sensor, arranged to provide a (3D) image with the help of radar waves. A plurality of sensors 50 may be applied; by way of example, a plurality of light sensors 50 is depicted, which together may provide the sensor signal. By way of example, a plurality of electromagnetic wave sensors 50 is depicted.

The illumination arrangement 1 further comprises a control unit 30 arranged to process the sensor signal to produce the control signal. The sensor is 50 especially arranged to sense (or monitor) the horticultural growth 100 and the control unit 30 derives from the sensor signal of the sensor 50 the information (especially horticultural growth characteristics) to control the lighting unit 10 which controls the optical properties of the beam of light 11 in response to the control signal generated by the control unit 30. The lighting unit 10 provides the illumination (by the beam of light 11) of the horticultural growth 100.

Due to the sensor 50, the control unit 30 and the controllable optical properties of the beam of light 11, the beam of light 11 may be adapted to the desired optical properties such as beam spectrum, beam shape and beam flux. For instance, the control 30 unit may be arranged to process the sensor signal to produce the control signal by determining one or more characteristics from the sensor signal selected from the group consisting of horticultural growth type, horticultural growth size, speed of growth of the horticultural growth, horticultural growth location, and horticultural growth appearance (such as one or more of horticultural growth colour, horticultural growth fruit content, horticultural growth fruit density) and calculating ("processing") the corresponding control signal to influence the growth of the horticultural growth 100 by means of one or more optical properties of the beam of light 11, especially selected from the group consisting of the beam flux, the beam shape, and the beam spectrum.

In a preferred embodiment, the optical property comprises the shape of the beam of light 11 and the control signal comprises a beam shape control signal. In such an embodiment, the lighting unit 10 is (at least) arranged to control the shape of the beam of light 11 in response to the beam shape control signal and the control unit 30 is arranged to determine the location of the horticultural growth 100 from the sensor signal. In this way, the beam shape control signal is produced. To this end, the lighting unit 10 may especially comprise the schematically depicted beam controller 40, which is indicated in this Figure (see further below).

The illumination arrangement 1 may further comprise an environment sensor 60. Such a sensor 60 may be a humidity sensor, an irrigation sensor, a temperature sensor, a gas sensor, a nutrient sensor, or a background light sensor. This optional environment sensor 60 is arranged to generate an environment sensor signal. The control unit 30 may further be arranged to process the environment sensor signal to produce the control signal. By way of example, a plurality of environment sensors 60 is depicted, which may for instance sense the background light, temperature and nutrient (concentration), respectively. Depending upon such an environment sensor signal, for instance the flux may be adapted (e.g. more nutrients, higher flux).

In yet another embodiment, the illumination arrangement 1 further comprises a specification information sensor 70. Such a specification information sensor 70 may especially be a RFID sensor. This optional specification information sensor 70 may be arranged to generate a specification information sensor signal. The control unit 30 may be further arranged to process the specification information sensor signal to produce the control signal. For instance, the horticultural growth 100 may be labelled with a RFID chip, schematically indicated with reference 71, with specification information selected for example from the group consisting of the desired delivery date, the horticultural growth type, the desired ripeness of the horticultural growth, the desired size of the horticultural growth, etc. The RFID sensor, or another specification information sensor 70, receives the specification information and couples this as a specification information sensor signal to the control unit 30, which may be arranged to use this specification information to tune the optical properties of the beam 11 such as flux, spectrum and shape. Thereby, the control unit 30 may control the lighting unit 10 to optimally illuminate the horticultural growth 100 (with respect to time).

Hence, from the sensor signal(s), information can be derived selected from the group consisting of one or more of horticultural growth type, speed of growth of the horticultural growth, horticultural growth location, horticultural growth appearance signal (such as one or more of horticultural growth colour, horticultural growth fruit content, and horticultural growth fruit density). However, also information (like humidity, temperature, time) can be derived from the other sensors, such as the environment sensor and specification information sensor.

Figure 2:
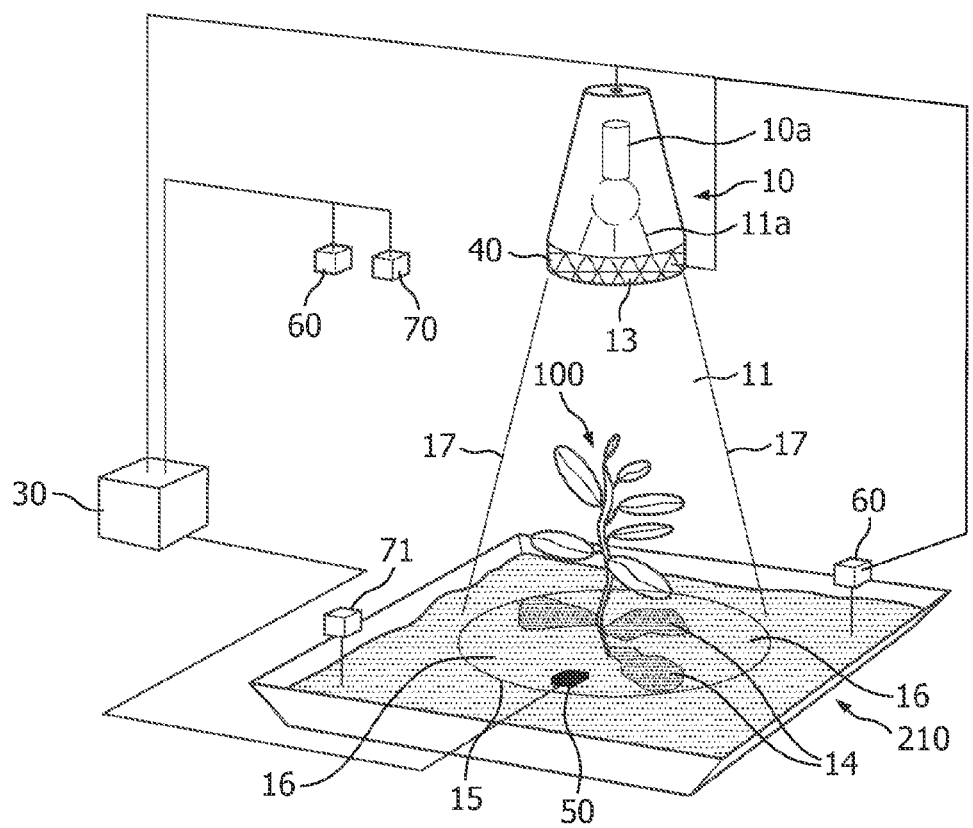
FIG. 2 schematically depicts in more detail the illumination of the horticultural growth(s) according to an embodiment of the invention.

In a specific embodiment, as schematically depicted in FIGS. 1 and 2, the lighting unit 10 further comprises the beam controller 40 arranged to control the shape of the beam of light 11 in response to the beam shape control signal. In such an embodiment, the optical property comprises the shape of the beam of light 11 and the control signal comprises a beam shape control signal. The control unit 30 is arranged to determine the location of the horticultural growth 100 from the sensor signal to produce the beam shape control signal. In this way, lighting of the horticultural growth 100 by beam 11 may be optimal, while superfluous lighting is minimized substantially and changes in appearance (like growth) and/or movement of the horticultural growth 100 can be taken into account. Hence, in a further specific embodiment, the control unit 30 and the beam controller 40 are arranged to control the shape of the beam of light 11, especially to illuminate substantially only the horticultural growth 100. The beam controller 40 may optionally further be arranged to control the flux of the beam of light 11. Hence, the control unit 30 and the beam controller 40 may further be arranged to control the flux of the beam of light 11, for instance to illuminate efficiently the horticultural growth 100, depending upon for instance the light demand of the horticultural growth 100 with respect to time.

In the embodiments schematically depicted in FIGS. 1 and 2, by way of example of possible embodiments, the collimator 12 comprises an opening 13, which opening 13 is arranged to allow light 10a to leave the collimator 12, and which opening 13 further comprises the beam controller 40. Hence, in these schematic drawings, the beam controller 40 is arranged downstream of the light source(s) 10a and is arranged to control the light 11a of the light source(s) 10a, thereby being arranged to control the beam shape of the beam of light 11 (downstream from the beam controller 40).

As mentioned above, the control unit 30 and the beam controller 40 may be arranged to control the beam of light 11 to illuminate substantially only the horticultural growth 100. This is further schematically shown in FIG. 2. FIG. 2 schematically shows a cross section 15 of the beam of light 11. This cross section 15 is downstream of at least part of the horticultural growth 100. In this configuration, "downstream" relates to the position of the cross section 15 of the beam of light 11 relative to the lighting unit 10 which produces the beam of light 11 of which the cross section 15 is discussed, and which lighting unit 10 is upstream of the horticultural growth 100. The terms "upstream" and "downstream" relate to the direction of propagation of the beam of light 11, wherein relative to a first position within the beam of light 11, a second position in the beam of light closer to the lighting unit 10 is upstream, and a third position within the beam of light further away from the lighting unit 10 is downstream.

Preferably, the cross section 15 of the beam 11 is taken at a position downstream from the horticultural growth 100, i.e. where substantially no horticultural growth 100 (except for (subterranean) roots of the horticultural growth under illumination) is available, or preferably at least no fruits, crop and leaves. Note however that the beam of light 11 is not necessarily a vertical beam of light, but may be directed in any direction to illuminate the horticultural growth 100.

The cross section has shadow areas 14, due to the interception of the beam of light by the horticultural growth 100, and may have non-shadow areas 16. Especially, the control unit 30 is arranged to optimize the ratio of shadow areas 15 to non-shadow areas 16, such that substantially all the light of the beam of light 11 is intercepted by the horticultural growth, and in such a manner that substantially no light is "lost".

Hence, the control unit 30 and the beam controller 40 may in this embodiment be arranged to control the beam of light 11 to illuminate substantially only the horticultural growth 100. The beam of light 11 may especially be defined as confined by the FWHM (full width half maximum). This is indicated with reference 17 (beyond this FWHM "edge" 17 the intensity is weaker than the half maximum intensity, and within the beam (within this "edge" or FWHM 17), the intensity is equal to or stronger than the FWHM intensity.

Figure 3A:
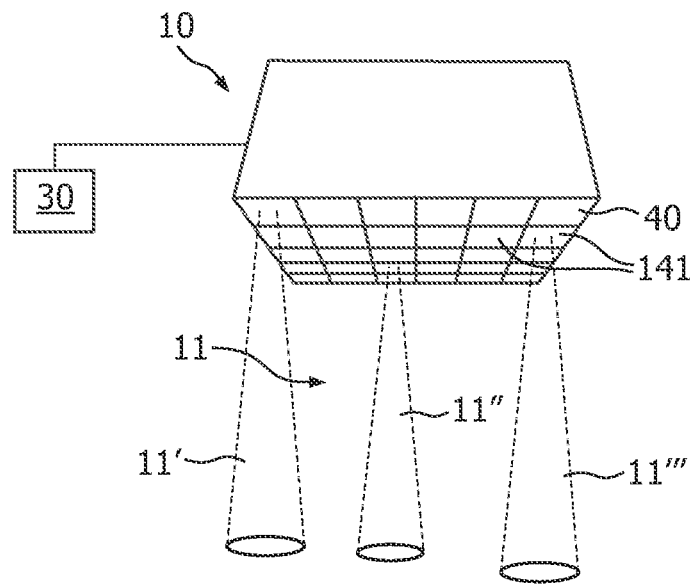
FIGS. 3a-3c schematically depict a number of embodiments of the lighting unit for generating a plurality of light beams.
Figure 3B:
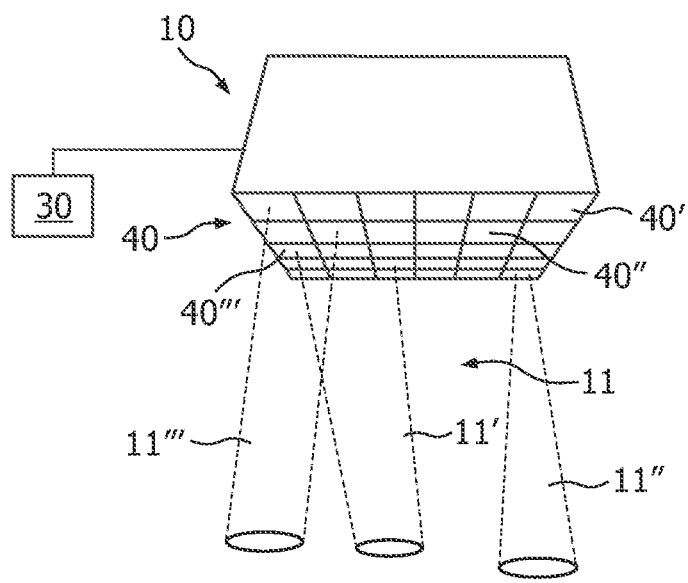
Figure 3C:
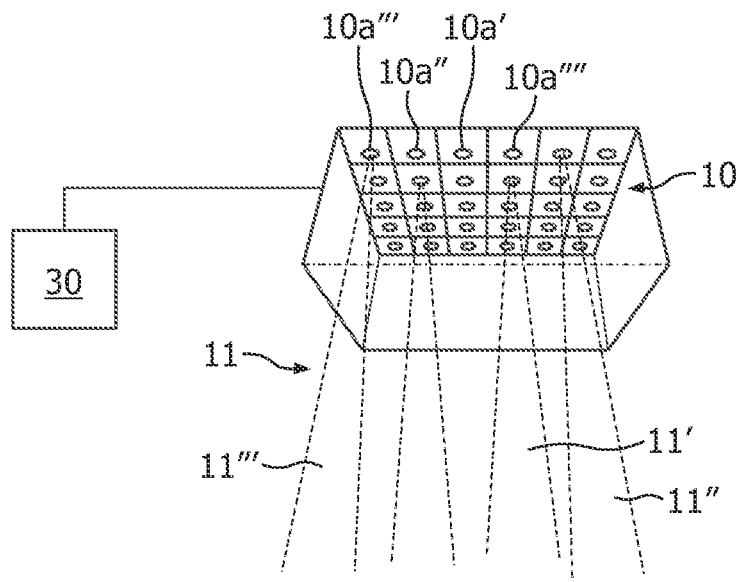

The beam of light 11 comprises, in an embodiment, a plurality of individual beams of light (indicated with references 11', 11", ... etc). Embodiments of the beam of light 11 comprising a plurality of beams of light 11', 11", ... etc, are schematically indicated in FIGS. 3a-3c. Here, the beam of light 11 is composed of the individual beams of light 11', 11", ... of the plurality of beams of light 11', 11", ....

FIG. 3a schematically depicts an embodiment wherein the lighting unit 10 comprises louvers with individual openings 141, arranged downstream of the light source(s) (not depicted in FIG. 1a), which individual openings 141 create, during use of the illumination arrangement 1, individual beams of light 11', 11", ....

In the schematically depicted embodiment of FIG. 3a, the illumination arrangement 1 may comprise a single beam controller 40 (controlling all beams of light 11', 11", ... ).

The individual beams of light 11', 11", ... etc. may be controlled by the control unit 30 in a number of ways. Controlling the optical properties of the individual beams of light 11', 11", ..., in response to the control signal, may be achieved by one or more of (a) addressing individual light sources, in embodiments wherein the individual beams of light stem from individual light sources (see below; FIG. 3c), (b) addressing individual colour filters for the individual light sources (not depicted), and (c) addressing individual beam controllers, in embodiments wherein the optical properties of the individual beams of light are controlled by individually addressable beam controllers (see below; FIG. 3b). In this way, the lighting unit (10) is arranged to control the optical properties of the individual beams of light 11', 11''', . . . , in response to the control signal.

In FIG. 3b, the beam controller 40 comprises a plurality of beam controllers 40', 40", . . . . The beam controllers 40', 40", . . . are especially arranged to control the optical properties (especially the beam shape and/or beam flux) of the individual beams of light 11', 11", . . . respectively, in response to the control signal. While a single beam 11 may still lead to less optimal use of light, a plurality of individually controllable beams of light 11', 11", . . . (forming beam of light 11 that is composed of individual beams) may further optimize the use of light, and may further allow shaping of the beam of light 11 with respect to the specific horticultural growth 100 under illumination. Note that the use of the individual beam controllers 40', 40", . . . may or may not include the use of louvers.

In yet another embodiment, the lighting unit 10 comprises a plurality of light sources 10a', 10a", . . . etc., such as a plurality of LEDs, like 2-1000 LEDs, such as 4-100 LEDs, especially 4-24 LEDs. Such an embodiment is schematically depicted in FIG. 3c. The light sources 10a', 10a", . . . may have the same or differing beam spectra (i.e. the wavelength range(s)) of the light emitted by the individual light sources, respectively), like for instance RGB LEDs. Using a plurality of light sources 10a', 10a", . . . (such as LEDs), of which two or more generate light at different wavelengths, allows adapting the spectrum of the beam of light 11 (i.e. the wavelength range(s)) of the light of the beam of light 11) depending upon for instance the sensor signal. Another advantage of using a plurality of light sources 10a', 10a", . . . may be that the light sources 10a', 10a", . . . may be addressed individually by the control unit 30, thereby further allowing beam shape, beam flux and optionally beam spectrum control.

Note that the embodiments schematically depicted in FIGS. 3a, 3b and 3c may be combined. For instance, the lighting unit 10 may comprise a plurality of light sources 10a', 10a", . . . and a plurality of beam controllers 40', 40", . . . , arranged to control the individual beams of light 11', 11", . . . of the individual light sources 10a', 10a'', . . . .

The above described embodiments may provide illumination arrangements 1, wherein the control unit 30 is arranged to process the sensor signal to produce the control signal in response to a predetermined relation between one or more optical properties of the beam of light 11, especially selected from the group consisting of the beam flux, the beam shape, and the beam spectrum, and (a) information selected from the group consisting of the horticultural growth speed, the horticultural growth location, and the horticultural growth appearance, the horticultural growth colour, the horticultural growth fruit content, the horticultural growth fruit density, derivable from the sensor signal, (b) a timer signal, and (c) information derivable from the environment sensor 60 and the information sensor 70. The environment sensor signal, information sensor signal and timer signal may be generated by sensors other than the electromagnetic wave sensors 50, i.e. the environment sensor(s) 60, the information sensor(s) 70, and the control unit 30 itself or an external timer, respectively.

The environment sensor signal may contain information selected from the group consisting of (atmospheric) humidity, irrigation, (atmospheric) temperature sensor, (atmospheric) gas sensor, nutrients, and background light. The specification information sensor signal may contain information selected from the group consisting of the desired delivery date, the horticultural growth type, the desired ripeness of the horticultural growth, etc.

The beam shape may be controlled in a number of ways. In an embodiment, the beam controller 40 comprises an adjustable mechanical optical beam shaping system, like for instance a collimator that has a variable collimation, controlled by mechanically moving collimator parts. In another embodiment, the beam controller 40 comprises one or more optical elements to control the shape of the beam of light 11, selected from the group consisting of an electrowetting lens, a liquid crystalline lens, a controllable scattering element, a controllable diffraction element, a refraction element and a reflection element.

FIGS. 4-12 schematically depict a number of embodiments of the beam controller 40, wherein the incoming light is indicated with reference 11a, i.e. the light 11a from light source(s) 10a, and wherein the outgoing light, i.e. the beam of light 11 or an individual beam of light 11', 11''', etc., is indicated with reference 11. These beam controllers 40 may especially control the beam shape, and optionally also the beam flux.

Figure 4:
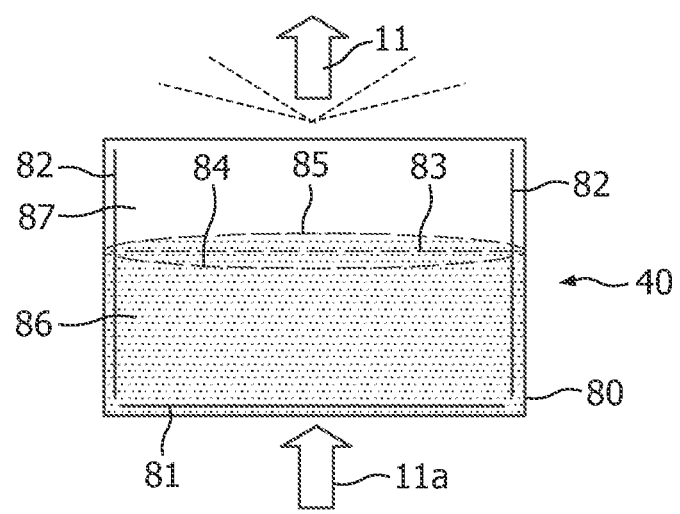
FIGS. 4-12 schematically depict a number of beam controllers for use in embodiments of the illumination arrangement according to the invention.

The beam controller 40 might for example comprise a fluid focus lens (array) 80 as shown in FIG. 4. By for example supplying an alternating current voltage with an adjustable amplitude via conductors 81 and 82 to a polar liquid 86 of the fluid focus lens (array) 80, at an interface of the polar liquid 86 and an a-polar liquid 87 a meniscus is formed. This meniscus has three different modes 83-85 comprising a convex mode and/or a concave mode that may have adjustable amplitudes. This way, the cone angle of the beam of light 11 can be adjusted, in view of the cone angle of the incoming light 11a.

Figure 5:
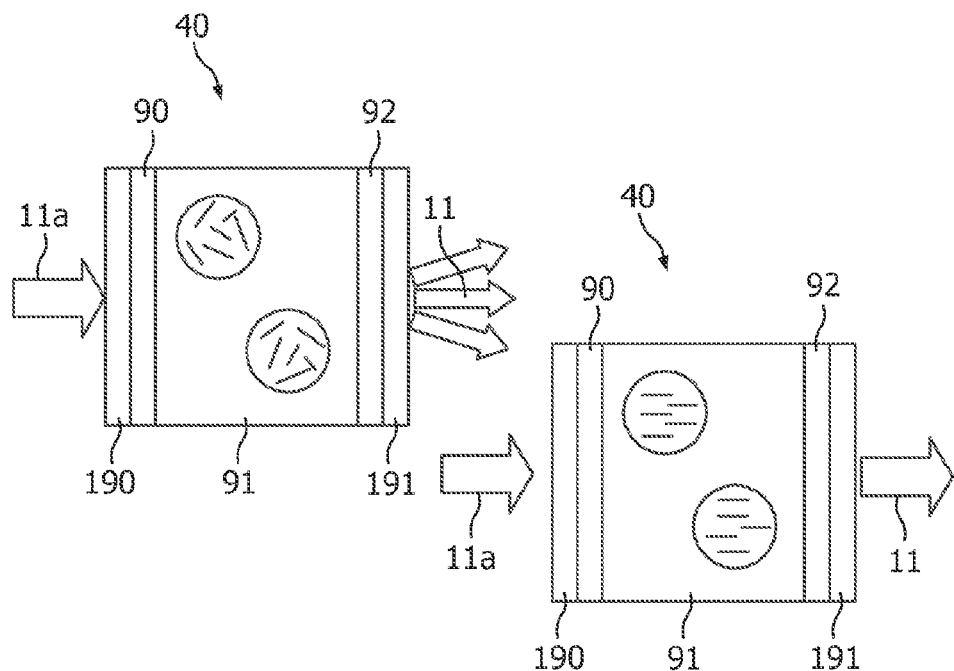
Figure 6:
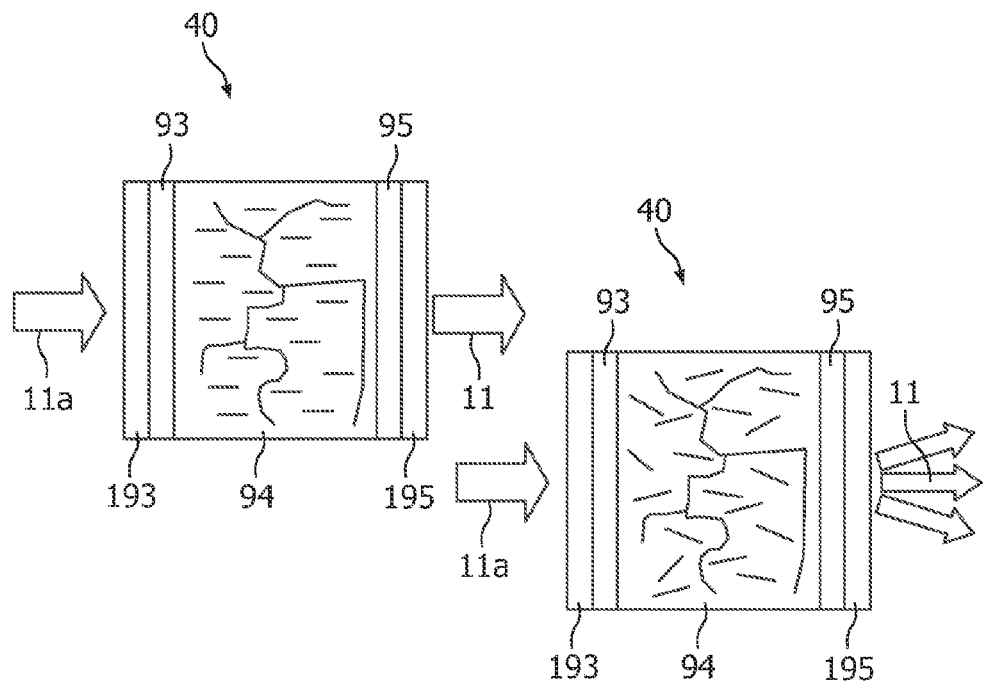

The beam controller 40 might for example comprise various liquid crystalline materials as shown in FIGS. 5 and 6. In FIG. 5 a material 91 which scatters light without any voltage is shown. In other words when a zero Volt signal is supplied to transparent electrodes 90 and 92 present on substrates 190 and 191, the incoming light 11a is scattered, and, in the drawing on the right-hand side, when a sufficiently high voltage is supplied, the material 91 becomes transparent. In FIG. 6 another material which is transparent without a voltage being applied is shown. When the voltage across the transparent electrodes 93 and 95 present on substrates 193 and 195 is zero, the material 94 is transparent, and, in the drawing on the right-hand side, when a sufficiently high voltage is applied across the electrodes, the incoming light 11a becomes scattered.

Figure 7:
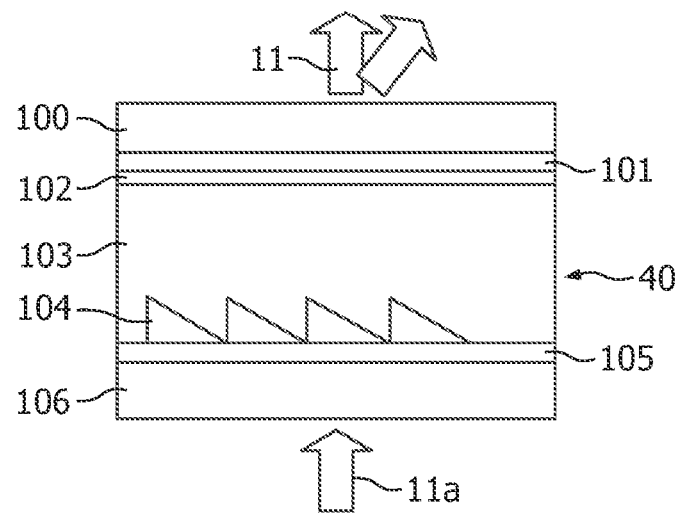

The beam controller 40 comprises one or more elements to control the shape of the beam of light and might for example comprise an element of a liquid crystalline material as shown in FIG. 7. From the top to the bottom, a glass substrate 100, a transparent electrode 101, an orientation layer 102, liquid crystalline material 103, an isotropic layer 104, a transparent electrode 105 and a glass substrate 106 are present. By supplying a zero Volt signal or a non-zero Volt signal, the incoming light 11a is refracted or not, owing to the fact that upon application of an electric field the orientation of the liquid crystal molecules is altered and the light beam can pass without getting refracted. If both polarization directions need to be effected, two such elements need to be used in a configuration where the orientations of liquid crystal molecules in the elements are orthogonal to each other. The orientation direction of the molecules can be kept the same, however, in that case a half-wave plate must be inserted between the elements.

Figure 8:
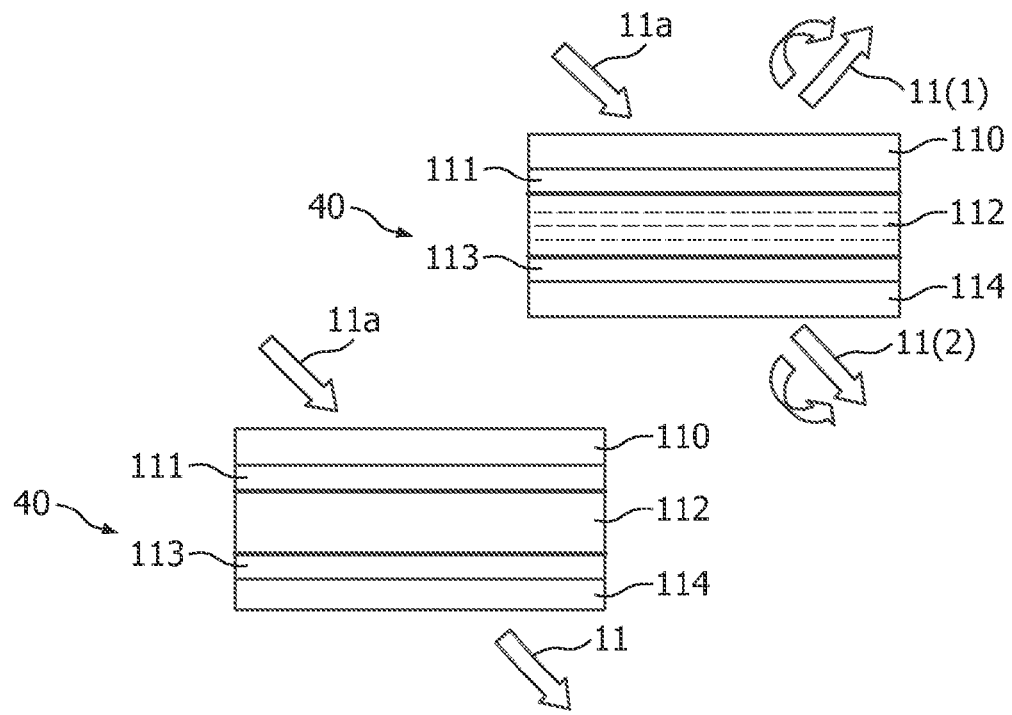

The beam controller 40 might for example comprise a so called chiral liquid crystalline material as shown in FIG. 8. In a zero voltage state, a liquid crystal 112 reflects a band of circularly polarized light 11(1) and passes a band of circularly polarized light 11(2) of the opposite sense. A voltage across the transparent electrodes 111 and 113 placed on top of the glass substrates 110 and 114 removes a helical structure from the liquid crystal 112 and makes the cell transparent. In order to reflect both polarization directions a double cell configuration can be used. In this configuration one of the possibilities is to use cells containing chiral materials reflecting left and right polarization directions of circularly polarized light. The other possibility is to use identical chiral material containing cells with a half-wave plate in between.

Figure 9:
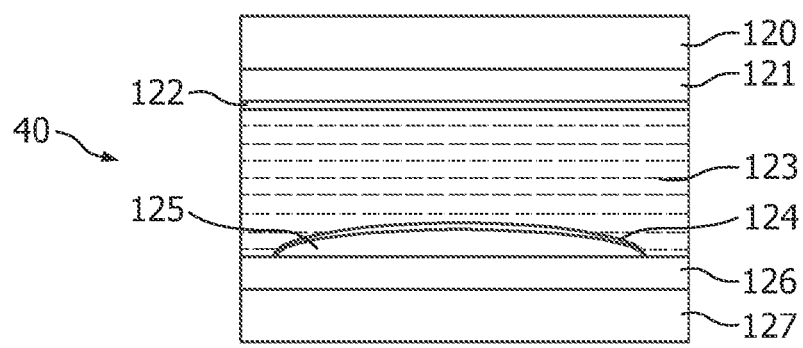
Figure 10:
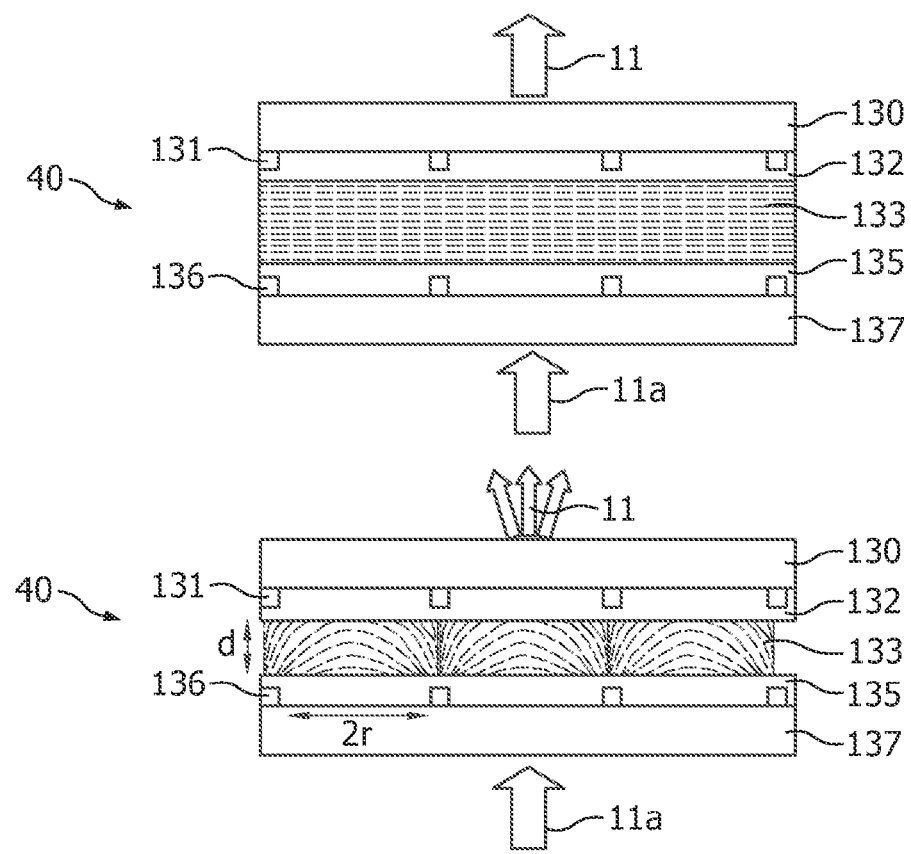
Figure 11A:
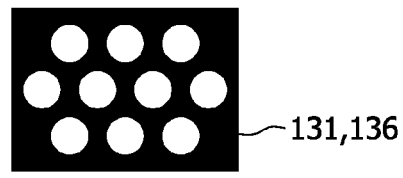
Figure 11B:
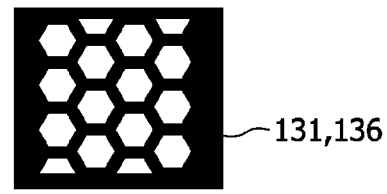
Figure 11C:
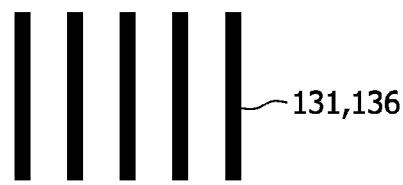
Figure 11D:
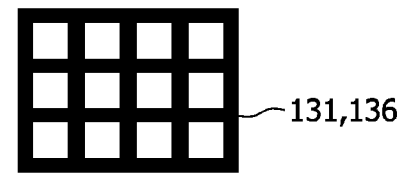
Figure 12:
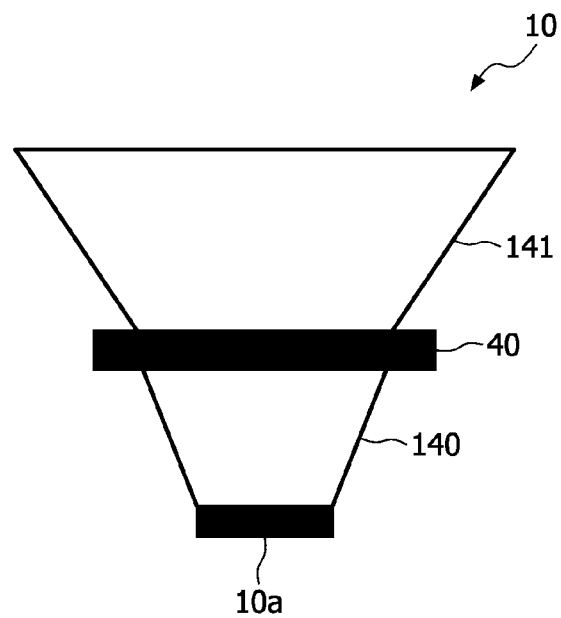

The beam controller 40 might be a liquid crystalline lens as shown in FIG. 9. Within the cell, structure 125 with a curvature is present. If the structure 125 is made of an isotropic material with a refractive index which is almost the same as one of the refractive indices of the liquid crystal, in zero voltage state, it works as a lens. Upon application of a voltage across the transparent electrodes 121 and 126 placed on top of glass substrates 120 and 127, liquid crystal molecules 123 are reoriented and the lens action disappears. The transparent electrode 121 is covered by an orientation layer 122 and the structure 125 is covered by an orientation layer 124. If the structure 125 is made of an anisotropic material with refractive indices almost the same as the refractive indices of the liquid crystal, in zero voltage state, no lens action is present. Upon application of a voltage across the transparent electrodes 121 and 126 placed on top of glass substrates 120 and 127, liquid crystal molecules 123 are reoriented and the lens action appears. A single element can work with only one linear polarization direction and therefore two elements are needed to influence both polarization directions. This is an example for a single lens, however it is also possible to make a lens array using such structures. The beam controller 40 might be a liquid crystalline refractive index gradient (GRIN) lens or array as shown in FIG. 10. Such an element comprises patterned electrodes. When both surfaces of the cell contain patterned electrodes, the surfaces are aligned with respect to each other so that the patterns show almost perfect overlap. In this situation the potential is highest between the electrodes. Outside the electrodes, field lines leak outside the cells resulting in non-uniform field lines. As a result, a refractive index gradient is formed in the area containing no electrodes. If the transparent electrodes contain circular holes, spherical lenses are formed, whereas the use of line electrodes at a periodic distance can induce cylindrical lenses. The electrode geometry can also have other forms, examples of which are shown in FIG. 10. FIG. 9 shows a cell with patterned electrodes (131,136) on glass substrates (132,135) containing a liquid crystal (133). Macroscopic orientation of liquid crystal molecules is induced with orientation layers (132,135) made of rubbed polymer layers. Patterned electrodes can have any structure and various examples are shown in FIG. 11. When the applied voltage across the electrodes (131,136) is zero, liquid crystal molecules are oriented uniaxially and there is no lens action within the cell, as shown in the top drawing of FIG. 10, and the beam 11*a* passes through the cell without being altered. Application of an electric field across the cell as shown in the bottom drawing of FIG. 10 results in a reflective index gradient being induced in the region between the electrodes, and the path of the light beam 11*a* is altered.

In another embodiment the GRIN lens can be produced using a cell where only on one of the surfaces an electrode pattern is provided and the other surface does not contain any pattern. In yet another embodiment the patterned electrode(s) is (are) covered by a layer with a very high surface resistance in the Mega Ohm/square range.

The GRIN lenses described above also show polarization dependence. If both polarization directions need to be effected, two such elements need to be used in a configuration where the orientations of the liquid crystal molecules in the elements are orthogonal to each other. In both elements the orientation direction of the molecules can be kept the same, however, in that case a half-wave plate must be inserted between the elements.

So, a beam controller 40 that can change the light distribution and/or its shape can be placed in front of a collimated light source. However, the beam controller 40 used for collimating and shaping the light can also be placed between the light source and one passive beam shaping element or, in the case of more than one passive beam shaping element, between the passive beam shaping elements. For example when a light emitting diode is used as a light source 10*a*, a reflector 140 and/or 141 with a certain shape can be used in order to obtain a light shape with a certain distribution. The beam controller 40 therefore can be placed between passive beam shaping elements 140 and 141, as shown in FIG. 11. The passive beam shaping elements can also consist of several segments and the beam controller can be placed at any location along the passive beam shaping elements 140 and 141. For example a controllable scattering element can transmit, in a transparent state, a beam such that when a zoom function is used it mainly illuminates the zoomed object. If an object at a closer distance is to be photographed, then the beam can be made broader using for example the controllable scattering element. In the same way certain parts of the object can be highlighted by adjusting the beam pattern. For example according to a decision of a person using the camera, one area might be illuminated more than one or more other areas, leading to highlighting that region. However, the controllable scattering element might be sending light as a wide beam which is not completely picked up by the camera lens, which might lead to losses; therefore it might be advantageous to place the beam controller 40 between two passive beam shaping elements or between the light source 2 and the passive beam shaping elements 140 and 141 to make it part of the collimating optics as described above. Alternatively, adjustable lenses or lens arrays can be used. In the same way as described above the element can be placed in front of the passive beam shaping element or can be incorporated in the passive beam shaping element structure.

In yet another embodiment, the beam controller 40 comprises rotating collimators. The term "beam controller" may refer to a plurality of beam controllers.

Hence, the lighting unit may comprise one or more of the above mentioned beam controllers 40, which may especially be arranged in series (i.e. one upstream (or downstream) of the other).

In above described embodiments, the beam of light 11 consists of light having a beam spectrum. Optionally, in a variant, the beam of light consists of light having a variable beam spectrum, i.e. the colour/colour point of the light of the beam of light 11 is variable. In such a variant, the lighting unit 10 is arranged to control the beam spectrum of the beam of light 11 in response to the control signal. Such an illumination arrangement 1 may be obtained by using a plurality of light sources 10*a'*, 10*a"*, ... with different spectra (as described above), but, or in addition thereto, may also be obtained by using colour filters.

The control unit 30 may further be arranged to determine one of a plurality of predefined types of horticultural growth 100 from the sensor signal and to produce the spectrum control signal. The control unit 30 may comprise a library of predefined types of horticultural growth 100, at least one type of horticultural growth 100, but preferably two or more, such as at least 5 types of horticultural growth 100. From the sensor signal, the control unit 30 derives the type of horticultural growth 100, and the control unit 30 then chooses, based on predetermined relations programmed in the (software of the) control unit 30, the specific beam spectrum and provides the corresponding control signal to the lighting unit 30. Hence, the illumination arrangement allows tailoring the beam spectrum to the type of horticultural growth 100.

The invention provides a climate controlled room 200 for growing horticultural growths 100, comprising the illumination arrangement 1 according to the invention, as described and claimed herein, see also FIG. 1.

The terms "blue light" or "blue emission" especially relates to light having a wavelength in the range of about 410-490 nm. The term "green light" especially relates to light having a wavelength in the range of about 500-570 nm. The term "red light" especially relates to light having a wavelength in the range of about 590-650 nm. The term "yellow light" especially relates to light having a wavelength in the range of about 560-590 nm. The term "light" used herein, such as in the term "beam of light", especially relates to visible light. The term "visible light" especially relates to light whose radiation has a wavelength selected from the range of about 400-700 nm.

The term "substantially" used herein, such as in "substantially all emission" or in "substantially consists", will be understood by the person skilled in the art. The term "substantially" may also include embodiments with "entirely", "completely", "all", etc. Hence, in embodiments the adverb substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The devices referred to herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system for illuminating at least one horticultural plant comprising:
    a lighting unit configured to generate a beam of light that illuminates the horticultural plant and to control an optical property of the beam of light in response to a control signal;
    an electromagnetic wave sensor selected from the group consisting of a charged coupled device (CCD) camera, complementary metal-oxide semiconductor (CMOS) camera, digital camera and a radar sensor, and configured to sense horticultural growth of the plant and to generate a sensor signal comprising one or more three-dimensional images of the horticultural growth; and
    a control unit configured to process the sensor signal and to produce the control signal based on the sensor signal.

2. The illumination system according to claim 1, wherein the optical property comprises a shape of the beam of light, wherein the control signal comprises a beam shape control signal that is based on the sensor signal, wherein the lighting unit further comprises a beam controller configured to change the shape of the beam of light in response to the beam shape control signal, and wherein the control unit is configured to determine a location of the horticultural growth from the sensor signal to produce the beam shape control signal.

3. The illumination system according to claim 2, wherein the control unit and the beam controller are configured to control the beam of light to illuminate substantially only the horticultural growth.

4. The illumination system according to claim 2, wherein the beam controller comprises an adjustable mechanical optical beam shaping system.

5. The illumination system according to claim 2, wherein the beam controller comprises one or more optical elements to control the shape of the beam of light, selected from the group consisting of an electrowetting lens, a liquid crystalline lens, a controllable scattering element, a controllable diffraction element, a refraction element and a reflection element.

6. The illumination system according to claim 1, wherein the lighting unit comprises a plurality of light sources.

7. The illumination system according to claim 6, wherein the lighting unit comprises a plurality of light sources with a plurality of different spectra, respectively.

8. The illumination system according to claim 1, wherein the beam of light consists of light having a variable beam spectrum, and wherein the lighting unit is configured to control the beam spectrum of the beam of light in response to the control signal, wherein the control signal comprises a spectrum control signal, wherein the lighting unit is further configured to provide a predefined beam spectrum corresponding to the determined horticultural growth type in response to the spectrum control signal, and wherein the control unit is further configured to determine one of a plurality of predefined types of horticultural growth from the sensor signal and to produce the spectrum control signal.

9. The illumination system according to claim 1, wherein the beam of light comprises a plurality of individual beams of light, wherein the lighting unit is configured to control the optical properties of the individual beams of light, in response to the control signal.

10. The illumination system according to claim 9, wherein the beam controller comprises a plurality of beam controllers, and wherein the beam controllers are configured to control the optical properties of the individual beams of light respectively, in response to the control signal.

11. The illumination system according to claim 6, wherein the optical property comprises the shape of the beam of light, wherein the control signal comprises a beam shape control signal, wherein the lighting unit is configured to control the shape of the beam of light in response to the beam shape control signal, and wherein the control unit is configured to determine the location of the horticultural growth from the sensor signal to produce the beam shape control signal.

12. The illumination system according to claim 1, further comprising an environment sensor selected from the group consisting of a humidity sensor, an irrigation sensor, a temperature sensor, a gas sensor, a nutrient sensor, and a background light sensor, wherein the environment sensor is configured to generate a environment sensor signal, and wherein the control unit is further configured to process the environment sensor signal to produce the control signal.

13. The illumination system according to claim 1, further comprising a specification information sensor selected from the group consisting of RFID sensors, wherein the specification information sensor is configured to generate a specification information sensor signal, and wherein the control unit is further configured to process the specification information sensor signal to produce the control signal.

14. The illumination system according to claim 1, wherein the electromagnetic wave sensor comprises a sensor selected from the group consisting of an IR image sensor and a visible light image sensor.

15. The illumination system according to claim 1, wherein the electromagnetic wave sensor comprises a radar sensor.

* * * * *